United States Patent
Orbey et al.

(10) Patent No.: US 11,926,933 B2
(45) Date of Patent: Mar. 12, 2024

(54) COMPOSITIONS COMPRISING POLY(P-PHENYLENE) AND CARBON FIBERS PRODUCED THEREFROM

(71) Applicant: University of Massachusetts, Boston, MA (US)

(72) Inventors: Nese Orbey, Acton, MA (US); Carl W. Lawton, Chelmsford, MA (US); Burcin Ikizer, Lowell, MA (US)

(73) Assignee: University of Massachusetts, Boston, MA (US)

( * ) Notice: Subject to any disclaimer, the term of this patent is extended or adjusted under 35 U.S.C. 154(b) by 602 days.

(21) Appl. No.: 17/084,923

(22) Filed: Oct. 30, 2020

(65) Prior Publication Data
US 2021/0130987 A1    May 6, 2021

Related U.S. Application Data

(60) Provisional application No. 62/927,877, filed on Oct. 30, 2019.

(51) Int. Cl.
*D01F 9/24* (2006.01)
*C01B 32/05* (2017.01)
*C08G 61/10* (2006.01)

(52) U.S. Cl.
CPC ............... *D01F 9/24* (2013.01); *C01B 32/05* (2017.08); *C08G 61/10* (2013.01); *C08G 2261/11* (2013.01); *C08G 2261/1426* (2013.01); *C08G 2261/93* (2013.01); *D10B 2505/02* (2013.01)

(58) Field of Classification Search
CPC .. D01F 9/24; D01F 6/96; C01B 32/05; C08G 61/10; C08G 2261/11; C08G 2261/1426; C08G 2261/93; C08G 2261/312; C08G 2261/728; D10B 2505/02; C08F 4/04; C08F 8/00; C08F 8/50; C08F 132/04; C09D 165/02
See application file for complete search history.

(56) References Cited

U.S. PATENT DOCUMENTS 5,187,035 A * 2/1993 Miyabayashi ........ H01M 4/364
429/231.95

OTHER PUBLICATIONS

Stille, et al., Poly(p-phenylene), Macromolecules 1971: 4(4): 515-517.*
Ballard, et al., Synthesis of Polyphenylene from a cis-Dihydrocatechol, a Biologically Produced Monomer, Macromolecules 1998; 21: 294-304 (Year: 1998).*
Ikizer, et al., Poly(para-phenylene) fibers—Characterization and preliminary data for conversion to carbon fiber, Polymer 2021; 228: 123945 (pp. 1-10) (Year: 2021).*

* cited by examiner

*Primary Examiner* — Daniel C. McCracken
(74) *Attorney, Agent, or Firm* — Schwegman Lundberg & Woessner, P.A.

(57) ABSTRACT

The disclosure relates to a method of making carbon fiber, the method comprising pyrolyzing poly(p-phenylene) (PPP) fiber at a temperature sufficient to convert PPP fiber substantially to carbon fiber. The disclosure also relates to pre-PPP polymer, methods for making PPP fiber from pre-PPP polymer and, in turn, making carbon fiber from PPP fiber.

17 Claims, No Drawings

COMPOSITIONS COMPRISING POLY(P-PHENYLENE) AND CARBON FIBERS PRODUCED THEREFROM

CROSS-REFERENCE TO RELATED APPLICATION

This application claims the benefit of priority to U.S. Provisional Patent Application Ser. No. 62/927,877 filed Oct. 30, 2019, the disclosure of which is incorporated herein in its entirety by reference.

STATEMENT OF GOVERNMENT SUPPORT

This invention was made with government support under Grant MEP 1549887 awarded by the National Science Foundation. The government has certain rights in the invention.

BACKGROUND

Carbon fibers have high stiffness, high tensile strength, low weight, high chemical resistance, high temperature tolerance, and low thermal expansion properties which makes them valuable in industries including aerospace, civil engineering, military, motorsports, and competition sports. Applications include reinforcement of composition materials such as reinforcement of polymers, filtration, metal matrix composites, carbon fiber-reinforced carbon, electrodes, and anti-static components. An example includes carbon fiber reinforced polymer resins used to make wind turbine blades.

Carbon fibers are sometimes made by heating raw fibers made from polyacrylonitrile (PAN) or isotropic pitch fibers at high temperatures (e.g., 1,000-2,000° C.). However, these procedures are expensive and have associated environmental issues. Glass fibers are less expensive, but have higher densities and lower fatigue ratios, making them less effective than carbon fibers for a variety of applications.

SUMMARY

The instant disclosure relates to poly(p-phenylene) (PPP), which has the repeating unit:

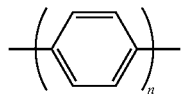

wherein n is an integer from about 150 to about 1500; PPP precursors and fibers made therefrom; PPP and fibers made therefrom; and carbon fibers made from PPP. Since PPP has an aromatic structure and contains only C and H atoms, compared to PAN, the polymer can be carbonized more effectively, at lower temperatures, to form carbon fibers.

In various embodiments of the present invention, the present invention provides a method of making carbon fiber. The method includes pyrolyzing poly(p-phenylene) (PPP) at a temperature sufficient to convert the PPP substantially to carbon fiber. In various embodiments, the present invention provides carbon fibers made by the method.

Various embodiments of the present invention provide a carbon fiber reinforced material including a plurality of the carbon fibers of the present invention.

Various embodiments of the present invention provide a method of making carbon fiber. The method includes synthesizing PPP from benzene. The method also includes pyrolyzing the PPP at a temperature sufficient to convert the PPP substantially to the carbon fiber.

Various embodiments of the present invention provide a pre-PPP polymer drawn, extruded, precipitated, or spun fiber, wherein the pre-PPP polymer has the repeating unit:

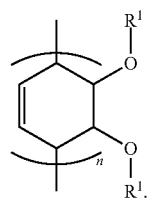

Each $R^1$ is, independently, $-C(O)R^2$, wherein each $R^2$ is independently a $C_1$-$C_{30}$ hydrocarbyl group. Various embodiments provide a pre-PPP fiber obtained with the method.

Various embodiments of the present invention provide a method of making pre-PPP polymer fibers. The method includes drawing, extruding, precipitating, or spinning a pre-PPP polymer composition into a pre-PPP polymer fiber. The pre-PPP polymer has the repeating unit:

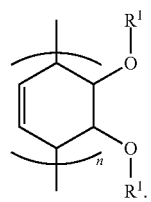

Each $R^1$ is, independently, $-C(O)R^2$, wherein each $R^2$ is independently a $C_1$-$C_{30}$ hydrocarbyl group.

Various embodiments of the present invention provide a method of making PPP fiber or film. The method includes aromatizing a pre-PPP polymer fiber or film to form the PPP fiber or film.

Various embodiments of the present invention provide a method of making a carbon fiber. The method includes precipitating a pre-PPP polymer fiber to form the pre-PPP polymer that is substantially free of pores or that includes pores distributed throughout the pre-PPP polymer fiber. The method includes heating the pre-PPP polymer fiber to form a porous PPP polymer fiber that can be substantially free of pores or that can be porous. The method includes heating the porous PPP polymer fiber at about 600° C. to about 2500° C. to form the carbon fiber. The carbon fiber can be substantially free of pores, or the carbon fiber can include pores distributed throughout the carbon fiber and having a diameter of 2 nm to 900 nm.

Various embodiments of the present invention provide a carbon fiber. In various embodiments, the carbon fiber is substantially free of pores. In other embodiments, the carbon fiber includes pores distributed throughout the carbon fiber. The pores have a size of 2 nm to 900 nm.

DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Methods of Making Poly(p-Phenylene) (PPP).

PPP can be synthesized in any suitable way, including from benzene, using methods known in the art. See, e.g., *Macromolecules* 20: 1787-1792 (1987). An example of a process for making PPP from benzene involves (1) dihydroxylation/reduction of benzene to form 5,6-dihydroxycyclohexa-1,3-diene (DHCD), (2) esterification of DHCD, (3) polymerization to form the soluble 1,4 (para) polymerized ester derivative (pre-PPP polymer), and (4) aromatization of the pre-PPP polymer into PPP. This process is illustrated in Scheme 1,

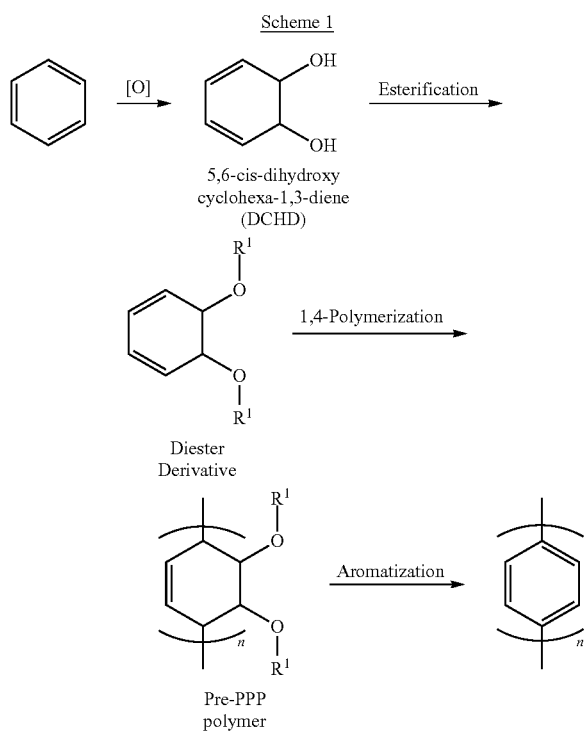

wherein each $R^1$ is, independently, —C(O)$R^2$, wherein each $R^2$ is independently a $C_1$-$C_{30}$ hydrocarbyl group, as the term is defined herein; and n is as defined herein. The $C_1$-$C_{30}$ hydrocarbyl group can be any suitable hydrocarbyl group. For example, the $C_1$-$C_{30}$ hydrocarbyl group can be at least one of an alkyl, alkoxy, alkenyl, alkynyl, acyl, aryl, and a cycloalkyl group. The $C_1$-$C_{30}$ hydrocarbyl group can be substituted or unsubstituted. A substituted $C_1$-$C_{30}$ hydrocarbyl group can be substituted with any suitable functional group, such as any organic group or such as any halogen. In some examples, the hydrocarbyl group is a $C_1$-$C_{20}$ hydrocarbyl group, or a $C_1$-$C_{10}$ hydrocarbyl group. The hydrocarbyl group can be a $C_1$-$C_{10}$ alkyl group, or a $C_1$-$C_6$ alkyl group, such as a methyl, ethyl, propyl, butyl, pentyl, or hexyl group; thus, in various examples, the ester can be an ethanoane (e.g., acetate), propanoate, butanoate (e.g., butyrate), pentanoate (e.g., valerate), hexanote (e.g., caproate), an octanoate (caprylate) ester or the like. Or the hydrocarbyl group can be a $C_1$-$C_{10}$ alkoxy group, or a $C_1$-$C_6$ alkoxy group, such as a methoxy, ethoxy, propoxy, butoxy, pentoxy, and the like. Or the two $R^2$ groups can form a group cyclic group of the formula —O(CH$_2$)$_g$—O—, wherein g is an integer from 1 to 3 (e.g., 1), such as those described in *Macromolecules* 21: 294-304 (1988), which is incorporated by reference as if fully set forth herein.

Thus, for example, DHCD can be derivatized using a number of compounds by an esterification reaction. For example, dimethyl carbonate (DMC) in the presence of a base catalyst to form the esterified derivative DHCD-DMC. During the esterification reaction, the stereo-specificity can be retained. During aromatization, DMC can eliminate in the form of methyl carbonic acid, which decomposes into methanol and carbon dioxide.

Although the DCHD mentioned in Scheme 1 is the cis isomer, the trans isomer can also be present. Accordingly, the instant disclosure also relates to mixtures of cis- and trans isomers of DCHD so long as an amount of the trans isomer present is less than about 1%. The DCHD can be substantially free of the trans isomer, such that the DCHD is substantially only the cis isomer. It can be important to isolate the cis-form of DHCD prior to esterification and polymerization for the formation of high-quality PPP.

The formation of DHCD allows 1,4 polymerization of the ester derivative. The pre-PPP polymer, in turn, leads to formation of PPP following aromatization, e.g., at temperatures ranging 100° C.-500° C. (e.g., at temperatures ranging from about 150° C. to about 300° C., about 200° C. to about 400° C. or about 250° C. to about 500° C.).

The dihydroxylation step can be performed enzymatically as described in greater detail herein, can be obtained by conventional organic chemical methods or it can be purchased commercially from MuseChem, Fairfield, NJ See, e.g., *JACS* 138: 16208-16211 (2016); *Chem. Lett.* 6: 353-356 (1977); *Polymer J.* 22: 187-190 (1990); *J. Polymer* 30: 1060-1062 (1989) for examples of conventional organic chemical methods.

The diester derivative can be synthesized from DHCD under any suitable esterification conditions to convert DHCD to a diester derivative prior to polymerization. Suitable esterification conditions include, for example, treating DCHD with a suitable base in the presence of a suitable carboxylic acid of the formula HO—C(O)$R^2$; such as acetic acid, ethanoic acid, propanoic acid, butanoic acid, benzoic acid, and the like; or an anhydride of the formula $R^2$(O)C—O—C(O)$R^2$, where $R^2$ is defined herein, such as acetic anhydride, propionic anhydride, butyric anhydride, valeric anhydride, hexanoic anhydride, stearic anhydride, benzoic anhydride, and the like.

Suitable bases for esterification include amine bases, such as primary, secondary, and tertiary amines having, e.g., amines of the formula N($R^3$)$_3$ wherein each $R^3$ group can independently be H or non-H, such as alkyl, aryl, and the like or two or three $R^3$ groups, together with the nitrogen to which they are attached can form a cyclic or bicyclic amine having one or two additional nitrogen atoms. Amines include but are not limited to alkylamines, dialkylamines, trialkylamines, cyclic amines, and the like, such as diethyalmine, triethylamine, pyrrolidine, piperidine, piperazine, quinuclidine, 1,8-diazabicyclo[5.4.0]undec-7-ene, and the like. Additional suitable bases include aromatic bases such as pyrrole, imidazole, pyridine, and the like.

The diester derivative mentioned in Scheme 1 can be the cis isomer, the trans isomer or mixtures of cis- and trans isomers. Accordingly, the instant disclosure relates to mixtures of cis- and trans isomers of the diester derivative so long as an amount of the trans isomer present is less than about 1%. The diester derivative can be substantially free of the trans isomer, such that the diester derivative is substantially only the cis isomer.

The diester derivative can be polymerized to give the pre-PPP polymer using methods known in the art. See, e.g., *Macromolecules* 20: 1787-1792 (1987). For example, a diester derivative can be free-radically polymerized in the presence of a suitable radical initiator. Examples of free radical polymerization initiators include azobisisobutyronitrile (AIBN), 1,1'-azobis(cyclohexanecarbonitrile), 4,4-azobis(4-cyanovaleric acid), benzoyl peroxide (BPO), and the like. The diester derivative can be polymerized to any suitable average molecular weight, such as to a molecular weight of from about 15 kDa to about 115 kDa, 20 kDa to about 100 kDa, about 20 kDa to about 80 kDa, about 30 kDa to about 70 kDA, about 30 kDa to about 60 kDA, about 50 kDa to about 100 kDa or about 40 kDa to about 70 kDa. The average molecular weight of the polymerization product of the diester derivative can be determined by methods known in the art, including Gel Permeation Chromatography. The polydispersity index (PI) of the polymerization product of the diester derivative can about 1.5 or about 2.0, such as from about 2 to about 2.5; about 1.50 to about 2.60; or about 1.4 to about 1.9.

The conversion of pre-PPP polymer to PPP can involve the thermally-induced elimination reaction of a carboxylic acid of the formula HO—C(O)R$^2$ to give PPP. Thus, for example, acetic acid can be thermally eliminated when the pre-PPP polymer has acetate (—C(O)CH$_3$) groups for R$^1$.

The pre-PPP polymer synthesized by the methods described herein can be doped to impart electrical conductivity on fibers made therefrom, since the pre-PPP polymer itself is substantially non-conductive. The pre-PPP polymer can be doped once synthesized or after the formation of fibers therefrom using applicable doping methods known in the art.

The pre-PPP polymer can be formed by a method including precipitating the pre-PPP polymer. The pre-PPP polymer can be substantially free of pores. In other embodiments, the pre-PPP polymer can be porous, such as having pores distributed throughout the pre-PPP polymer. The pre-PPP polymer can be a porous nano-structured solid.

The PPP fiber formed from the pre-PPP polymer can be substantially free of pores. In other embodiments, the PPP fiber formed from the pre-PPP polymer can be porous, such as having pores distributed throughout the PPP fiber. The PPP fiber can be a porous nano-structured solid. The pores in the pre-PPP polymer or the PPP fiber can have any suitable dimensions, such as 2 nm to 900 nm, or 2 nm to 500 nm, or 2 nm to 200 nm.

Method of Making Fibers from the Pre-PPP Polymer and PPP.

The instant disclosure also provides a method of making fibers from one or both of the pre-PPP polymer and PPP. The fibers can be precipitated, drawn, extruded, or spun fibers.

Spinning or drawing the fibers can be performed using any suitable method. Spinning or drawing the fibers can include treating the pre-PPP polymer such that it is obtained in a flowable state, such as by at least one of melting or dissolving the pre-PPP polymer in a solvent, such as THF, chloroform NMP (N-methyl-2-pyrrolidone), or combinations thereof or with chemical treatment. In some examples, spinning the fibers can include extruding the composition through a die or spinneret. After extrusion the fibers can cool or dry for a semi-crystalline or amorphous or solid state.

The spinning can be wet spinning, wherein pre-PPP polymer or PPP is dissolved in a solvent, and wherein the spinneret is submerged in a chemical bath that causes the fiber to precipitate, and then solidify, as it emerges. The spinning can be dry spinning, wherein the composition is dissolved in a solvent, and the solvent is evaporated after extrusion from the spinneret to solidify the fiber. The spinning can be melt spinning, wherein the polymer is melted and forced through the spinneret, after which it cools and becomes solidified. The spinning can include extrusion spinning, wherein the composition is placed in an extruder which heats and melts the composition, then feeds the hot melted composition to a spinning pump and then on to the spinneret. The spinning can be direct spinning, wherein the composition is originally in a liquid state and does not require melting or fluidization steps. The spinning can be gel spinning, also called dry-wet spinning, wherein the composition is in a gel state during formation before being dried and cooled. The spinning can be electrospinning, which uses an electrical charge to draw fine fibers from a liquid. In some examples, spinning the fibers can include continuously spooling the extruded fiber. The method of spinning provided in this disclosure can include any suitable combination of spinning techniques.

In some instances, PPP fibers can be obtained from pre-PPP polymer fibers via a thermally-induced elimination reaction of a carboxylic acid of the formula HO—C(O)R$^2$ to give PPP. Thus, for example, acetic acid is thermally eliminated when the pre-PPP polymer fiber has acetate (—C(O) CH$_3$) groups for And in some instances, pre-PPP polymer fibers might be converted to carbon fibers without the isolation of PPP.

Methods of Making Carbon Fibers from PPP Fibers.

PPP fiber can be converted to carbon fibers in any suitable way, including by pyrolyzing PPP at a temperature sufficient to convert PPP substantially to carbon fiber (a.k.a. "carbonization" of PPP), for example, by heating the PPP at a temperature of at least about 600° C., at least about 700° C., at least about 800° C., at least about 900° C., at least about 1000° C. or at least about 1500° C.; about 600° C. to about 1000° C., about 750° C. to about 1000° C., about 600° C. to about 900° C., about 700° C. to about 900° C., or about 1000° C. to about 2000° C., or about 600° C. to about 2500° C., about 1000° C. to about 1700° C. See, e.g., *Applied Science and Manufacturing* 91: 262-282 (2016). The pyrolyzing of the PPP can performed under a substantially inert atmosphere, e.g., under a nitrogen or argon atmosphere or an atmosphere including a combination of nitrogen and argon.

The pyrolyzing can be employed with (thin) films of PPP, not only PPP fibers. In addition, as illustrated in Scheme 1, aromatizing pre-PPP polymer to the PPP can be performed prior to the pyrolyzing.

The pyrolyzing of the PPP fibers can be performed, for example, using a tubular furnace (e.g., Thermo Scientific Lindberg/BlueM two-zone tubular reactor). PPP fibers are placed in a quartz tube of a tubular furnace and purged with argon for an amount of time and at a flow rate sufficient to reduce the amount of oxygen in the atmosphere surrounding the PPP fibers (e.g., 10 minutes). The temperature profile can then be set at predetermined values, including heating rate, maximum temperature, and whether the temperature is increased at a constant rate, without stopping and holding the temperature in-between or in steps, where the temperature might be held at one or more points in-between. For example, PPP fibers can be heated directly to a given maximum temperature at a rate (e.g., a constant rate), without holding the temperature at any given temperature in-between. Or PPP fibers can be heated to a given maximum temperature in steps, where the temperature is raised to each step at a given rate (e.g., a constant rate) and held at each step for a given amount of time.

Once the final temperature is reached and, e.g., held at the final pyrolysis temperature for a given period of time, the resulting carbon fibers derived from PPP fibers are cooled at a given rate (e.g., at a constant rate that can be the same or different than the rate at which the final temperature is reached). In one example, a furnace containing PPP fibers is heated to a temperature of about 1000° C. at 15° C./min, the temperature is held for 30 minutes, and then the furnace is cooled to room temperature at the same rate of 15° C./min. Or a furnace containing PPP fibers can be heated stepwise to a temperature of about 600° C., then about 800° C., and then about 1000° C. at 15° C./min. After each temperature (600° C., 800° C., and 1000° C.) is reached, the temperature is held for 30 minutes, then the furnace is cooled to room temperature at the same rate of 15° C./min. The resulting carbon fibers can be characterized using any suitable method, including Raman Spectroscopy, since Raman spectroscopy is a powerful tool for characterizing the structure of carbonaceous materials. Any of scanning electron microscopy, x-ray, elemental analysis using XPS, mechanical and electrical and thermal property measurements can also be used to characterize the resulting carbon fibers.

Methods for making carbon fibers from PPP fibers can include a graphitization step after the carbonization step. See, e.g., *Applied Science and Manufacturing* 91: 262-282 (2016). Graphitization can include heating the fiber or fibers at a temperature of at least about 2000° C., at least about 2500° C., at least about 3000° C., or at least about 3500° C.; about 2000° C. to about 2500° C., about 2100° C. to about 3000° C., about 2500° C. to about 3000° C. or about 2000° C. to about 3000° C. The graphitization of the PPP fibers can be performed under a substantially inert atmosphere, e.g., under a nitrogen or argon atmosphere.

Aromatization (e.g., conversion of pre-polymer to PPP) and carbonization/graphitization stages can be performed with the respective materials under tension for further chain alignment. While not wishing to be bound by any specific theory, it is believed that tension causes the otherwise rigid fibers to align along the direction of the fiber axis. Since PPP is a very stiff molecule, any orientation of the molecules in the fiber is believed to occur during the aromatization process. Molecular orientation becomes increasingly more difficult as the extent of aromatization increases.

Methods for making carbon fibers from PPP fibers can include a thermostabilization step, which can occur prior to heating of the PPP fibers for carbonization of the fibers. The thermostabilization step can help to prevent the fibers from fusing together during the process of carbonizing the fibers to give carbon fibers. The thermostabilization can include heating to a temperature slightly above the boiling point of water to remove moisture, with the rate of heating adjusted to a suitable rate. For example, the thermostabilization can include heating the fibers to about 101° C., about 105° C., about 110° C., about 115° C., about 120° C., about 130° C. or greater. The rate of heating can be about 0.01° C./min, about 0.1, about 1, about 2, about 4, about 6, about 8, or about 10° C./min or more. The thermostabilization can include heating to a higher temperature for an extended time, as a single step or as an additional step to the water removal. The thermostabilization can include heating to about 120° C., about 150° C., about 175° C., about 200° C., about 225° C., about 250° C., about 275° C., about 300° C., about 400° C., or about 500° C. The rate of heating can be about 0.001° C./min, about 0.01° C./min, about 0.1° C./min, about 1° C./min, about 2° C./min, about 4° C., about 6° C., about 8° C., or about 10° C./min or more. The final temperature can be held for a suitable amount of time, until the thermostabilization is substantially complete. For example, the temperature can be held for about 1 min, about 2 min, about 5 min, about 10 min, about 30 min, about 1 h, about 2 h, about 4 h, about 10 h, about 15 h, about 20 h or about 30 h. The holding of the temperature can occur in any suitable atmosphere. In various embodiments, the holding of the temperature can occur in an atmosphere that is enriched in nitrogen or argon, such as about 5%, about 10%, about 25%, about 50%, about 75%, about 90%, or about 100% nitrogen or argon.

Properties of Carbon Fibers.

The structure of the carbon fiber(s) derived from PPP can be solid with substantially no pores or voids. Or the carbon fiber(s) can be porous, or have microvoids.

The carbon fibers can have any suitable dimensions. For example, the fibers can have a diameter of about 0.001 μm to about 50 μm; about 0.005 μm to about 20 μm; about 0.005 μm to about 10 μm; about 0.003 μm to about 0.007 μm; about 0.1 μm to about 1 μm; about 1 μm to about 7 μm; about 0.1 μm to about 300 μm; about 100 μm to about 160 μm, or about 100 μm to about 145 μm, or about 0.01 μm to about 300 μm, about 0.5 μm to about 100 μm, about 50 μm to about 100 μm, about 20 μm to about 80 μm, about 0.5 μm to about 20 μm, or about 1 μm to about 10 μm. The fibers can have any suitable length, for example, about 0.01 mm to about 1 m or more.

The carbon fibers can have any suitable tensile strength. For example, the fibers can have a tensile strength of greater than about 1 GPa, greater than about 3 GPa, greater than about 5 GPa or greater than about 10 GPa; from about 1 GPa to about 20 GPa, about 1 GPA to about 10 GPa, about 3 GPa to about 7 GPa or about 5 GPA to about 7 GPa.

The carbon fibers can have any suitable tensile modulus. For example, the fibers can have a tensile modulus of greater than about 100 GPa, greater than about 150 GPa, greater than about 300 GPa or greater than about 500 GPa; from about 100 GPa to about 1000 GPa, about 100 GPA to about 500 GPa, about 300 GPa to about 500 GPa or about 250 GPA to about 450 GPa.

In carbon fibers including microvoids or pores, the carbon fiber can have an average surface area of about 100 $m^2/g$ to about 900 $m^2/g$, about 300 $m^2/g$ to about 700 $m^2/g$, about 400 $m^2/g$ to about 600 $m^2/g$, about 500 $m^2/g$ to about 600 $m^2/g$, or about 500 $m^2/g$ to about 550 $m^2/g$, as measured using a Brunauer, Emmett and Teller (BET) instrument. Carbon fiber including microvoids or pores can have an average pore volume of about 0.05 $cm^3/g$ to about 0.700 $cm^3/g$, about 0.100 $cm^3/g$ to about 0.500 $cm^3/g$, about 0.200 $cm^3/g$ to about 0.600 $cm^3/g$, about 0.300 $cm^3/g$ to about 0.400 $cm^3/g$, or about 0.300 $cm^3/g$ to about 0.350 $cm^3/g$, as determined using a BET instrument. The microvoids can have any suitable shape. For example, the microvoids can be approximately oblong or roughly cylindrical in shape and aligned with the length of the fiber.

The carbon fibers can be porous nano-structured carbonized solids. The carbon fibers can include pores distributed throughout, such as having a pore size of 2 nm to 900 nm, or 2 nm to 500 nm, or 2 nm to 200 nm.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the disclosure, except when a temporal or operational sequence is explicitly recited.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "pore" as used herein refers to a depression, slit, or hole of any size or shape in a solid object. A pore can run all the way through an object or partially through the object. A pore can intersect other pores.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature between about 15° C. and about 28° C.

As used herein, "carbon fiber" refers to a fiber including at least 90 wt. % carbon.

EXAMPLES

The disclosure can be better understood by reference to the following examples which are offered by way of illustration. The disclosure is not limited to the examples given herein.

Example 1: Enzymatic Dihydroxylation/Reduction of Benzene

As *P. putida* 11767 is a proprietary strain and is not commercially available, a new strain had to be developed.

*E. coli* clone containing (todA, todB, and todC): The *E. coli* catalyst was prepared by cloning the toluene dioxygenase complex (todA, todB, and todC) from *Pseudomonas putida* F1 (ATCC 700007) and transforming them into *E. coli* BL21(DE3). The synthetic gene was created utilizing PCR and the Gibson Assembly (NEB #E5510S). Genomic DNA (ATCC 70000D-5) was the source DNA for PCR amplification. The product of the Gibson Assembly was ligated into double cut pET-24a(+) and used to transform *E. coli* BL21(DE3). Positive plates were detected by the formation of indigo (blue colonies).

Reactor formation of 5,6 cis-dihydroxycyclohexane-1,3-diene (DHCD): An overnight culture (50 mL of modified LB plus 50 µg/ml kanamycin) was used to inoculate four liters of production media in a (temperature (30° C.), pH (7.2), dissolved 02 (30%)) controlled 8 liter Bellco reactor. After 16 hours of growth, 50 mL of reactant (20% benzene in hexadecane) was added to the reactor and allowed to react for 32 hours. Lactose was added as needed. Benzene was constantly supplied with a nitrogen (benzene saturated) sparge. Under these conditions, 20 grams of purified DCHC was obtained.

Purification of 5,6-cis-dihydroxycyclohexane-1,3-diene (DHCD): The cells were separated by centrifugation and the supernatant separated into two phases in a separatory funnel. The aqueous bottom layer was further refined by filtration (0.2 µm) to remove small emulsified particles. The filtered material was then applied to an ion exchange chromatography (Q and S) column to remove charged impurities. The column (previously stored in methanol) was first washed with DI water and then the filtered sample was introduced followed by DI water. The filtered flow-through was collected by visualization of the sample peak using a PerSeptive Biosystems CR112 Flatbed Recorder. The flow-through after ion exchange chromatography was very dilute in water and concentrating by evaporation took several hours. Therefore, an activated carbon column was tested to extract the DHCD sample and replace the liters of aqueous solvent with less than one-liter pure methanol. Activated carbon column worked well in terms of decreasing the sample volume however we found that too much material is lost in the column as methanol was not a good eluent and the column would reach breakthrough quickly. Since material recovery is critical in the production process, we decided not to use activated carbon column after ion exchange. The semi purified material was concentrated by freeze fractionation. The concentrated material was then extracted four times with methylene chloride. The methylene chloride solution was concentrated to 200 mL under vacuum. DCHC was precipitated by the addition of six hundred mL of pentane. Purified crystals were obtained by filtration.

The flow-through after ion exchange was collected and condensed by rotary evaporation under vacuum. The concentrated material was then further purified with a 100 mL Reverse Phase (SP20SS) column in order to separate hydrophobic impurities. The hydrophobic impurities leave the column in order of their hydrophilicity. The recorder showed three peaks, the first two peaks being broad short peaks, and the third being one strong peak, which was collected separately and confirmed with characterization to be the desired DHCD product. The sample was again dried with a rotary evaporator to remove excess DI water that diluted the sample. The material identification and impurity analysis was analyzed via $^1$H NMR and High Performance Liquid Chromatography (HPLC), respectively. Both methods show that the cis-DHCD is highly pure.

Example 2: Esterification of DHCD

After purification of DHCD, an esterification reaction was carried out to convert the cis-DHCD to a diacetate (DHCD-DA) prior to polymerization to the pre-PPP polymer. The purified DHCD was weighed and added to a clean, dried, 3-neck round-bottom flask that was flushed with nitrogen. The diol was first dissolved in excess pyridine (1.3 mol DHCD to 4.2 mol pyridine) at room temperature, and then cooled to −10° C. prior to adding acetic acid anhydride (4 mol) drop-wise to the reaction while the temperature was maintained under 0° C. The entire reaction was carried out under nitrogen gas in a hood for 2-3 hours or until the reaction is confirmed complete via Thin Layer Chromatography (TLC).

The reaction workup was performed as follows: an excess amount of diethyl ether was added to the solution and transferred to a separating funnel. The solution was then washed three times with 10% aqueous sodium bicarbonate, three times with water, and then with 1N HCl. Residual water was removed by addition of sodium sulfate. An aliquot was taken to confirm the absence of pyridine in the sample by running TLC in comparison to the commercial DHCD diol and pure pyridine dissolved in 1% methylene chloride. The reaction product DHCD-DA monomer mixture was then concentrated by removing the solvents in successive stages of evaporation, washing/drying and vacuum distillation. Product identification was carried out with $^1$H NMR spectroscopy and showed that the DHCD-DA is highly pure.

Example 3: Polymerization of DHCD-DA

DHCD-DA was added to the flask. Azobisisobutyronitrile (AIBN) initiator (weight ratio 281:1) was added in three parts to the glass reactor and stirred continuously under an inert atmosphere. The reactor was heated to 70° C. The polymerization reaction was monitored for 4-5 days by MW measurements obtained via gel permeation chromatography and viscosity changes. The reaction was considered complete when MW remained constant. Pre-PPP polymer was dissolved in chloroform and precipitated in hexane. Four sets of polymerization reactions were carried out, resulting in average MWs of 30,000-60,000 Da. The pre-PPP polymer was characterized by $^1$H NMR spectroscopy.

Example 4: Aromatization of Pre-PPP Polymer into Poly(p-Phenylene) (PPP)

The conversion of pre-PPP polymer to PPP involves the thermally-induced elimination reaction of acetic acid. Thus, isolating the cis-form of DHCD prior to esterification and polymerization can be important for the formation of high-quality PPP. Thermal conversion of the precursor polymer to PPP is not a straightforward process. Two competing reactions occur during pyrolysis: (1) thermally-induced acid elimination leading to PPP formation and (2) thermal chain degradation leading to a reduction in polymer molecular weight. In order to demonstrate that pre-PPP polymer could be converted to PPP ATR-FTIR, TGA, and UV-Vis analyses were employed.

Attenuated total reflectance Fourier transform infrared spectroscopy (ATR-FTIR) used to determine the structure of PPP samples. ATR is one accessory that can be used to measure this surface properties. ATR with germanium crystal was used, with a penetration depth of 0.7 microns and wavelength range of 5500-600 cm$^{-1}$. The pre-PPP polymer was dissolved in small amounts of tetrahydrofuran (THF). The solution with THF was filtered through a small plug of glass microfiber paper and spin coated (SCS G3P-8 Spincoat, Cookson Electronics; 30 seconds at 1500 rpm, 30 seconds at 1000 rpm) in five layers onto copper slides. The coated slides were left in a hood overnight to evaporate excess THF from the thin film. Aromatization of the thin-film polymer to form PPP was carried out in a tubular oven under an inert atmosphere. The time-temperature profile of aromatization was as follows: (i) sample was heated at 5° C./min until 100° C. and held for 1 hour, (ii) heated from 100 to 300° C. at 2° C./min and held for 5 hours, (iii) heated from 300 to 400° C. at 2° C./min and held for 1 hour, and (iv) cooled from 400 to 50° C. at 10° C./min. Typically, the regiochemistry of polyphenylene chains can be determined by comparing the relative intensities of two sets of bands in the IR spectrum of the material: (1) a band at approximately 800-810 cm$^{-1}$, which is due to the C—H out of plane bending of the 1,4-substituted benzene repeat units, and (2) two bands at approximately 760-697 cm$^{-1}$, which are due to the C—H out of plane bending modes of the monosubstituted end group units of the polymer. For high molecular weight, completely 1,4-linked polyphenylene, the intensity of the 810 cm$^{-1}$ band is expected to be much greater than that of the two end group bands.

The IR spectrum of a thin PPP film obtained by the pyrolysis of pre-PPP polymer on a copper slide is dominated by an intense band at 809 cm$^{-1}$, which is characteristic of PPP repeat units. The intensity of this repeat unit band is stronger than that of the two end group bands at 762 and 699 cm$^{-1}$. This high ratio of repeat unit to end group band intensities is a qualitative indication that the PPP film made from pre-PPP polymer consists of high molecular weight, para-linked polyphenylene chains. A band at 789 cm$^{-1}$ attributes to the C—H bending of 1,2-phenylene units which is absent in our results. A band at 1745 cm$^{-1}$ characteristic of the C=O stretching of residual acetate groups is absent, indicating that aromatization of pre-PPP polymer is complete.

Thermogravimetric Analysis (TGA) monitors the weight loss of a material as a function of increasing temperature. The time-temperature profile of TGA was as follows: (i) sample was heated at 10° C./min until 100° C. and held for 30 min, (ii) heated from 100 to 500° C. at 10° C./min. Pre-PPP polymer can lose 61.2% of their original weight if complete conversion to polyphenylene occurs during the heating process. In this case pre-PPP polymer loses around 67% which is only a slightly more weight than expected for complete aromatization. Two competing reactions can occur during pyrolysis: (1) thermal degradation resulting in backbone fracturing and the evolution of small aromatic molecules and (2) thermally induced acid elimination resulting in polyphenylene formation and the evolution of acetic acid, as shown in Scheme 2.

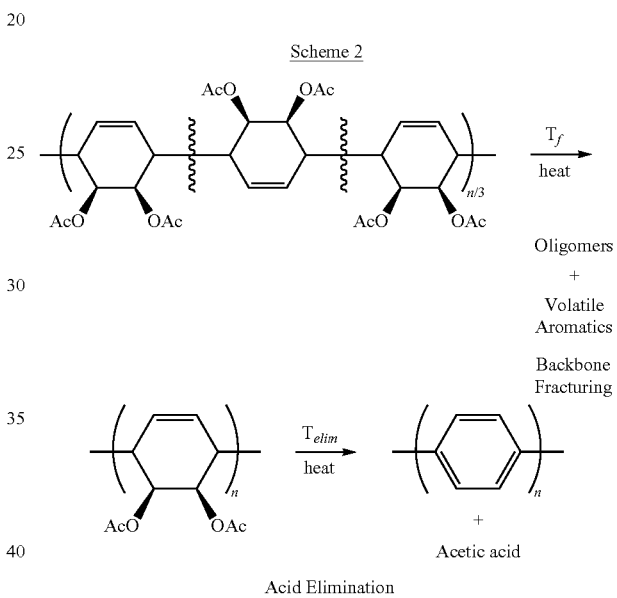

UV-visible spectroscopy was used to characterize the PPP samples made from pre-PPP polymer. The pre-PPP polymer was dissolved in small amounts of THF, chloroform or NMP to assess feasibility of obtaining a spin dope. The solution with THF was filtered through a small plug of glass microfiber paper and spin coated (SCS G3P-8 Spincoat, Cookson Electronics; 30 seconds at 1500 rpm, 30 seconds at 1000 rpm) in five layers onto quartz microscope slides (25.4× 16×1 mm$^3$). The coated slides were left in a hood overnight to evaporate excess THF from the thin film. Aromatization of the thin-film polymer to form PPP was carried out in a tubular oven under an inert atmosphere. The time-temperature profile of aromatization was as follows: (i) sample was heated at 5° C./min until 100° C. and held for 1 hour, (ii) heated from 100 to 300° C. at 2° C./min and held for 5 hours, (iii) heated from 300 to 400° C. at 2° C./min and held for 1 hour, and (iv) cooled from 400 to 50° C. at 10° C./min. The resulting dark yellow thin film was analyzed by UV-Vis spectroscopy (Perkin Elmer Lamba 25) and compared with the film from before aromatization. The max of an infinitely long PPP chain was reported to be 339 nm. Prior to aromatization, no prominent peaks were present past 200 nm. However, all of our aromatized samples showed $\lambda_{max}$ values of 325-345 nm thus confirming formation of PPP.

The onset temperatures of these two competing reactions are highly dependent upon the structure of the polymers. According to these results, the degree of thermal chain fracturing is less than that of acetic acid elimination and aromatization is the dominant reaction as pre-PPP polymer is heated to higher temperatures.

Example 5: Carbonization of PPP Thin Films

Literature shows that isotropic pitch fibers can be successfully carbonized at 1000, 1500 and 2000° C. under nitrogen atmosphere. Similarly, PAN-based fibers can be carbonized at 1300° C. at a rate of 4° C./min from room temperature in an oxygen-free atmosphere. The extent of carbonization and structural properties of the resulting carbon fibers can be measured by RAMAN spectroscopy and elemental analysis using X-ray photoelectron spectroscopy (XPS). Utilizing bulk-pyrolyzed PPP thin-films, a carbonization process like those used to produce carbon fibers was implemented, however keeping in mind that polyphenylene produced from poly(1,3-cyclohexadiene) has a slight thermogravimetric break around 817° C. under nitrogen atmosphere. Therefore, it was decided to run carbonization tests at three different temperature steps of 600, 800 and 1000° C. Since PPP's aromatic structure and contains only C and H atoms, it was hypothesized that the polymer will be carbonized more effectively compared to PAN, which is a random coil, linear polymer containing C, H, and N atoms. Conversion of PAN into CF requires cyclization of the linear structure and elimination of H and N atoms. In the processes described herein, there is no need for the oxidative stabilization step and no need to remove additional types of atoms, such as nitrogen atoms in PAN.

To test this hypothesis, thin-film PPP samples were carbonized by pyrolysis under an inert atmosphere. A tubular furnace (Thermo Scientific Lindberg/BlueM two-zone tubular reactor) was used in the pyrolysis experiments. Samples were placed in the quartz tube and purged with argon for 15 minutes at high flow-rate. The temperature profile was then set at the predetermined values and the argon flow-rate was lowered prior to heating. Two different types of experiments were conducted. In the first experiment, PPP film was heated directly to 1000° C. at 15° C./min, held for 30 min, and then cooled to room temperature at the same rate. In the second experiment, PPP film was heated stepwise to 600, 800, and 1000° C. at 15° C./min. After each temperature (600, 800, and 1000° C.) was achieved, the sample was held for 30 min, cooled to room temperature. The resulting carbonized films were characterized using Raman Spectroscopy. Raman spectroscopy is a powerful tool for characterizing the structure of carbonaceous materials.

Raman Spectroscopy (Bruker Senterra) was carried out under the following conditions: Objective: 50× Raman, Laser: 532 nm, Power: 5 mW, Resolution: 9-18 cm'. Commercial aerospace-grade CF was used as the standard for comparison. RAMAN spectra of the commercial CF showed two characteristic bands around 1356 and 1599 $cm^{-1}$, termed the D (disordered) and G (ordered or graphitic, C—C) bonds, respectively. Results also showed these D and G bands. Samples carbonized at 600° C. had a broader peak at 1356 $cm^{-1}$, indicating incomplete carbonization. At 800 and 1000° C., carbonization was complete, but the ratio of the G band to the D band was lower than that of the commercial CF. This finding indicates the necessity of a graphitization stage, wherein PPP is exposed to higher temperatures under an inert atmosphere.

Example 6: Fiber Formation from the Melt and Solution of Pre-PPP Polymer

After the completion of polymerization reaction fibers were directly pulled out from the pre-PPP polymer melt using a glass micropipette (with an extra-long drawn-tip) and were placed on quartz glass slides. Those of skill in the art will recognize that the fibers can be made using other methods known in the art for making fibers from a melt or a solution of a polymer. The pre-PPP polymer is soluble in a variety of solvents due at least to the presence of —OR groups in its structure. The polymer was dissolved in small amounts of THF, chloroform or NMP (N-methyl-2-pyrrolidone) to assess feasibility of obtaining a spin dope for solution spinning. A solution was ultimately prepared with THF (43 wt. %), was filtered through a small plug of glass microfiber paper, and was placed under a fume hood for 5 hours. Fibers were pulled out from this solution in a similar manner as described above. The average fiber diameter was 100 microns.

Rheological properties of a pre-PPP solution and melt were studied in the linear viscoelastic range using oscillatory shear experiments. An ARES G2 (TA Instruments) rheometer was used with cone and plate (25 mm in diameter, 0.04 rad) fixture. Experiments were carried out at 25° C. A strain amplitude sweep was carried out at strains of 0.1 to 100% and at a frequency of 10 rad/s to determine the linear viscoelastic region. The range of linear behavior extends to 5% and subsequent frequency sweep measurements were performed between 0.1 and 100 rad/s at strain amplitudes of 1, 2 and 5% respectively.

Example 7: Aromatization of the Pre-PPP Polymer Fibers to PPP Fibers

Aromatization of the pre-PPP fibers to form PPP fibers was carried out in a tubular oven under inert atmosphere. The same time-temperature profile which mentioned in Example 5 for aromatization of the thin-film polymer to form PPP was used.

Example 8: Carbonization of PPP Fibers to Form Carbon Fibers (CFs)

Obtained PPP fibers were carbonized by pyrolysis under inert atmosphere. A tubular furnace (Thermo Scientific Lindberg/BlueM two-zone tubular reactor) was used to conduct pyrolysis experiments. Samples were placed in the center of a quartz tube and purged for 15 min under argon at a high flow rate. The temperature profile was set to predetermined values, with the argon flow rate being reduced before heating. PPP fibers were heated to 1000° C. at 15° C./min, held for 30 min, and then cooled to room temperature at the same rate.

Example 9: Raman Spectroscopy Results for Carbon Fiber

The resulting CFs were characterized using Raman Spectroscopy. Raman Spectroscopy (Bruker Senterra) was carried out under the following conditions: Objective: 20× Raman, Laser: 532 nm, Power: 2 mW, Resolution: 9-15 $cm^{-1}$. Measurements were made at five randomly chosen points in each of four different areas on the CF. Consistent results were obtained from different areas on CF.

Results for the averaged Raman spectra compared to results for a commercial aerospace-grade CF. Consistent with values reported in the literature, the commercial CF showed two characteristic bands at around 1360 and 1593 cm$^{-1}$, termed the D (disordered) and G (ordered or graphitic, C—C) bonds, respectively. CFs produced in this study also showed these D and G bands, indicating that we obtained CFs by using PPP fiber as a precursor. PPP thin films were also carbonized at the same conditions used for PPP fibers and the Raman spectra obtained. The same two characteristic carbon bands were observed from the carbonization of PPP films as well.

The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure claimed. Thus, it should be understood that although the disclosure specifically provides certain embodiments and optional features, modification and variation of the concepts herein disclosed may be resorted to by those of ordinary skill in the art, and that such modifications and variations are considered to be within the scope of this disclosure as defined by the appended claims.

Additional Embodiments

The disclosure provides for the following examples, the numbering of which is not to be construed as designating levels of importance:

Embodiment 1 provides a method of making carbon fiber, the method comprising:
pyrolyzing poly(p-phenylene) (PPP) at a temperature sufficient to convert the PPP substantially to carbon fiber.

Embodiment 2 provides the method of Embodiment 1, wherein the PPP is in the form of a fiber or film.

Embodiment 3 provides the method of any one of Embodiments 1-2, wherein the PPP is porous or is substantially free of pores.

Embodiment 4 provides the method of any one of Embodiments 1-3, wherein the PPP is a porous nano-structured solid.

Embodiment 5 provides the method of any one of Embodiments 1-4, further comprising aromatizing pre-PPP polymer to the PPP prior to the pyrolyzing.

Embodiment 6 provides the method of any one of Embodiments 1-5, wherein the temperature sufficient to convert the PPP substantially to the carbon fiber is at least about 600° C.

Embodiment 7 provides the method of any one of Embodiments 1-6, wherein the temperature sufficient to convert the PPP substantially to the carbon fiber is about 600° C. to about 2500° C.

Embodiment 8 provides the method of any one of Embodiments 1-7, wherein the temperature sufficient to convert the PPP substantially to the carbon fiber is about 600° C. to about 1700° C.

Embodiment 9 provides the method of any one of Embodiments 1-8, wherein pyrolyzing is performed under a substantially inert atmosphere.

Embodiment 10 provides the method of Embodiment 9, wherein the substantially inert atmosphere comprises argon, nitrogen, and combinations thereof.

Embodiment 11 provides the method of any one of Embodiments 1-10, wherein the PPP is derived from benzene.

Embodiment 12 provides the method of any one of Embodiments 1-11, wherein the PPP is derived from a pre-PPP polymer having the repeating unit:

wherein each $R^1$ is, independently, —C(O)$R^2$, wherein each $R^2$ is independently a $C_1$-$C_{30}$ hydrocarbyl group.

Embodiment 13 provides the method of Embodiment 12, wherein the $C_1$-$C_{30}$ hydrocarbyl group is a $C_1$-$C_{10}$ alkyl group.

Embodiment 14 provides the method of Embodiment 13, wherein the $C_1$-$C_{30}$ hydrocarbyl group is methyl.

Embodiment 15 provides the method of Embodiment 12, wherein the hydrocarbyl group is a $C_1$-$C_{10}$ alkoxy group.

Embodiment 16 provides the method of any one of Embodiments 12-15, wherein the pre-PPP polymer is a precipitated pre-PPP polymer.

Embodiment 17 provides the method of any one of Embodiments 12-16, wherein the pre-PPP polymer is porous or is substantially free of pores.

Embodiment 18 provides the method of Embodiment 17, wherein the pre-PPP polymer comprises pores distributed throughout the pre-PPP polymer.

Embodiment 19 provides the method of any one of Embodiments 17-18, wherein the pre-PPP polymer comprises pores having a diameter of 2 nm to 900 nm.

Embodiment 20 provides the method of any one of Embodiments 12-19, wherein the pre-PPP polymer is a porous nano-structured solid.

Embodiment 21 provides carbon fiber made by the method of any one of Embodiments 1-20.

Embodiment 22 provides the carbon fiber of Embodiment 21, wherein the carbon fiber has a diameter of about 0.1 μm to about 300 μm.

Embodiment 23 provides the carbon fiber of any one of Embodiments 21-22, comprising pores occupying about 0.01% to about 50% of the volume of the carbon fiber, wherein the carbon fiber has an average pore volume of about 0.100 cm$^3$/g to about 0.500 cm$^3$/g.

Embodiment 24 provides the carbon fiber of any one of Embodiments 21-23, wherein the carbon fiber has an average surface area of about 300 m$^2$/g to about 700 m$^2$/g, as determined using BET.

Embodiment 25 provides the carbon fiber of any one of Embodiments 21-24, wherein the carbon fiber is porous or is substantially free of pores.

Embodiment 26 provides the carbon fiber of Embodiment 25, wherein the carbon fiber comprises pores distributed throughout the carbon fiber.

Embodiment 27 provides the carbon fiber of any one of Embodiments 25-26, wherein the carbon fiber comprises pores having a diameter of 2 nm to 900 nm.

Embodiment 28 provides the carbon fiber of any one of Embodiments 21-27, wherein the carbon fiber is a porous nano-structured solid.

Embodiment 29 provides a carbon fiber reinforced material comprising a plurality of carbon fibers of any one of Embodiments 21-28.

Embodiment 30 provides a method of making carbon fiber, the method comprising:
synthesizing PPP from benzene; and
pyrolyzing PPP at a temperature sufficient to convert PPP substantially to carbon fiber.

Embodiment 31 provides the method of Embodiment 30, wherein the PPP in the pyrolyzing step is in the form of a fiber or film.

Embodiment 32 provides the method of any one of Embodiments 30-31, further comprising aromatizing a pre-PPP polymer to the PPP prior to the pyrolyzing.

Embodiment 33 provides the method of any one of Embodiments 30-32, wherein the temperature sufficient to convert PPP substantially to carbon fiber is at least about 600° C.

Embodiment 34 provides the method of Embodiment 33, wherein the temperature sufficient to convert PPP substantially to carbon fiber is about 600° C. to about 2500° C.

Embodiment 35 provides the method of any one of Embodiments 33-34, wherein pyrolyzing is performed under a substantially inert atmosphere.

Embodiment 36 provides a pre-PPP polymer drawn, extruded, precipitated, or spun fiber, wherein the pre-PPP polymer has the repeating unit:

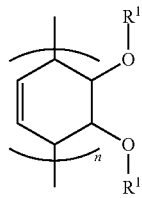

wherein each $R^1$ is, independently, —C(O)$R^2$, wherein each $R^2$ is independently a $C_1$-$C_{30}$ hydrocarbyl group.

Embodiment 37 provides the pre-PPP polymer fiber of Embodiment 36, wherein the hydrocarbyl group is a $C_1$-$C_{10}$ alkoxy group.

Embodiment 38 provides a PPP fiber obtained from the pre-PPP fiber of any one of Embodiments 36-37.

Embodiment 39 provides the PPP fiber of Embodiment 38 obtained via a thermally-induced elimination reaction of a carboxylic acid of the formula OH—C(O)$R^2$ from the pre-PPP polymer fiber.

Embodiment 40 provides a method of making pre-PPP polymer fibers comprising:
drawing, extruding, precipitating, or spinning a pre-PPP polymer composition into a pre-PPP polymer fiber, wherein the pre-PPP polymer has the repeating unit:

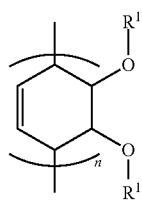

wherein each $R^1$ is, independently, —C(O)$R^2$, wherein each $R^2$ is independently a $C_1$-$C_{30}$ hydrocarbyl group.

Embodiment 41 provides the method of Embodiment 40, wherein the pre-PPP polymer composition is a pre-PPP polymer solution or a pre-PPP polymer melt.

Embodiment 42 provides the method of Embodiment 41, wherein the pre-PPP polymer solution is a solution of pre-PPP polymer in a solvent.

Embodiment 43 provides the method of Embodiment 42, wherein the solvent is THF, chloroform, NMP (N-methyl-2-pyrrolidone) or combinations thereof.

Embodiment 44 provides the method of any one of Embodiments 40-43, wherein the hydrocarbyl group is a $C_1$-$C_{10}$ alkoxy group.

Embodiment 45 provides a method of making PPP fiber or film, the method comprising:
aromatizing a pre-PPP polymer fiber or film to form the PPP fiber or film.

Embodiment 46 provides a method of making a carbon fiber, the method comprising:
precipitating a pre-PPP polymer fiber to form the pre-PPP polymer comprising pores distributed throughout the pre-PPP polymer fiber;
heating the pre-PPP polymer fiber to form a porous PPP polymer fiber; and
heating the porous PPP polymer fiber at about 600° C. to about 2500° C. to form the carbon fiber, wherein the carbon fiber comprises pores distributed throughout the carbon fiber and having a diameter of 2 nm to 900 nm.

Embodiment 47 provides a carbon fiber comprising:
pores distributed throughout the carbon fiber, the pores having a size of 2 nm to 900 nm.

Embodiment 48 provides the method, carbon fiber, carbon fiber reinforced material, or PPP fiber of any one or any combination of Embodiments 1-47 optionally configured such that all elements or options recited are available to use or select from.

What is claimed is:

1. A method of making carbon fiber, the method comprising:
aromatizing a pre-poly(p-phenylene) (PPP) polymer at a temperature of at least 400° C. to form poly(p-phenylene) (PPP); and
pyrolyzing the PPP at a temperature sufficient to convert the PPP substantially to carbon fiber.

2. The method of claim 1, wherein the PPP is in the form of a fiber or film.

3. The method of claim 1, wherein the PPP is porous.

4. The method of claim 1, wherein the aromatizing is performed at a temperature of 400° C. to about 500° C.

5. The method of claim 1, wherein the temperature sufficient to convert the PPP substantially to the carbon fiber is about 600° C. to about 2500° C.

6. The method of claim 1, wherein the pre-PPP polymer comprises the repeating unit:

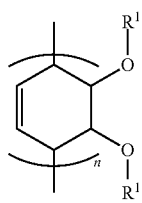

wherein each $R^1$ is, independently, —C(O)$R^2$, wherein each $R^2$ is independently a $C_1$-$C_{30}$ hydrocarbyl group.

7. The method of claim 6, wherein the pre-PPP polymer is a precipitated pre-PPP polymer.

8. The method of claim 6, wherein the pre-PPP polymer is porous.

9. The method of claim 1, wherein the carbon fiber is porous.

10. The method of claim 1, further comprising forming a carbon fiber reinforced material comprising a plurality of the carbon fibers.

11. The method of claim 1, wherein the pre-PPP polymer is a drawn, extruded, precipitated, or spun fiber.

12. The method of claim 11, further comprising drawing, extruding, precipitating, or spinning a pre-PPP polymer composition into the pre-PPP polymer fiber.

13. A method of making carbon fiber, the method comprising:
synthesizing a pre-poly(p-phenylene) (PPP) polymer from benzene;
aromatizing the pre-PPP polymer at a temperature of at least 400° C. to form a PPP polymer; and
pyrolyzing the PPP at a temperature sufficient to convert the PPP substantially to carbon fiber.

14. The method of claim 13, wherein the PPP in the pyrolyzing step is in the form of a fiber or film.

15. The method of claim 13, wherein the PPP polymer is in the form of a film, wherein the aromatizing is performed at a temperature of 400° C. to about 500° C.

16. The method of claim 13, wherein the temperature sufficient to convert PPP substantially to carbon fiber is at least about 600° C.

17. The method of claim 16, wherein the temperature sufficient to convert PPP substantially to carbon fiber is about 600° C. to about 1700° C.

* * * * *